US 7,784,618 B2

(12) United States Patent
Stang Hauge et al.

(10) Patent No.: US 7,784,618 B2
(45) Date of Patent: Aug. 31, 2010

(54) METHOD AND A DEVICE FOR TRANSPORTING IDENTIFIED PACKAGING UNITS

(75) Inventors: Geir Stang Hauge, Oslo (NO); Svein Idsøe, Oslo (NO); Tore Torvbråten, Bødalen (NO)

(73) Assignee: Tomra Systems ASA, Asker (NO)

( * ) Notice: Subject to any disclaimer, the term of this patent is extended or adjusted under 35 U.S.C. 154(b) by 409 days.

(21) Appl. No.: 10/598,708

(22) PCT Filed: Mar. 7, 2005

(86) PCT No.: PCT/NO2005/000083

§ 371 (c)(1),
(2), (4) Date: Nov. 13, 2006

(87) PCT Pub. No.: WO2005/087629

PCT Pub. Date: Sep. 22, 2005

(65) Prior Publication Data

US 2007/0175734 A1      Aug. 2, 2007

(30) Foreign Application Priority Data

Mar. 11, 2004    (NO) .................................. 20041032

(51) Int. Cl.
*G06F 7/10* (2006.01)
(52) U.S. Cl. .................. 209/552; 209/522; 209/523; 209/583; 198/475.1; 198/370.05
(58) Field of Classification Search ................ 209/522, 209/552, 583; 198/475.1, 370.05
See application file for complete search history.

(56) References Cited

U.S. PATENT DOCUMENTS

| | | | | |
|---|---|---|---|---|
| 2,226,750 A | * | 12/1940 | Traylor et al. | ................ 209/463 |
| 4,465,177 A | | 8/1984 | Dorner | |
| 4,892,179 A | * | 1/1990 | Lassiter et al. | ......... 198/370.05 |
| 4,987,992 A | * | 1/1991 | Pfleger | .................... 198/475.1 |
| 5,038,910 A | * | 8/1991 | Lassiter et al. | ............ 198/349.6 |
| 5,190,162 A | * | 3/1993 | Hartlepp | ..................... 209/583 |
| 5,311,999 A | * | 5/1994 | Malow et al. | ............... 209/583 |
| 5,361,913 A | | 11/1994 | Melchionna | |
| 5,497,887 A | * | 3/1996 | Hiebert | ....................... 209/538 |

(Continued)

FOREIGN PATENT DOCUMENTS

DE          4329193 A1    3/1995

(Continued)

*Primary Examiner*—Patrick H Mackey
*Assistant Examiner*—Terrell H Matthews
(74) *Attorney, Agent, or Firm*—Rodman & Rodman

(57) ABSTRACT

A method and device for individually transporting articles of different type, size, weight, material or shape to one delivery location of a plurality of delivery locations that is designated for the respective article. The articles are placed one by one in respective transport containers, and the respective article is caused at a desired respective delivery location to be transferred from its transport container to a collecting or storage bin, disintegrator or further conveyor dedicated to the article, the transport container at the designated delivery location being made to discharge the article under the effect of gravity or with the aid of a separate, controlled actuating means. The respective article is identified prior to it being placed in a transport container. Identification may, for example, be related to the material of which the article is made.

19 Claims, 14 Drawing Sheets

U.S. PATENT DOCUMENTS

| | | | |
|---|---|---|---|
| 5,526,921 A * | 6/1996 | Kovalak et al. | 198/706 |
| 5,628,408 A * | 5/1997 | Planke et al. | 209/522 |
| 6,321,899 B1 * | 11/2001 | Hannessen | 198/475.1 |
| 6,384,421 B1 * | 5/2002 | Gochar, Jr. | 250/559.46 |
| 6,484,886 B1 * | 11/2002 | Isaacs et al. | 209/539 |
| 6,945,386 B2 * | 9/2005 | Bierschenk et al. | 198/713 |
| 7,059,465 B2 * | 6/2006 | Chan | 198/465.3 |

FOREIGN PATENT DOCUMENTS

| | | |
|---|---|---|
| DE | 19756532 A1 | 7/1998 |
| EP | 0212858 A1 | 3/1987 |
| EP | 0532028 A1 | 3/1993 |
| JP | 7185476 A | 7/1995 |
| JP | 10000434 A | 1/1998 |

* cited by examiner

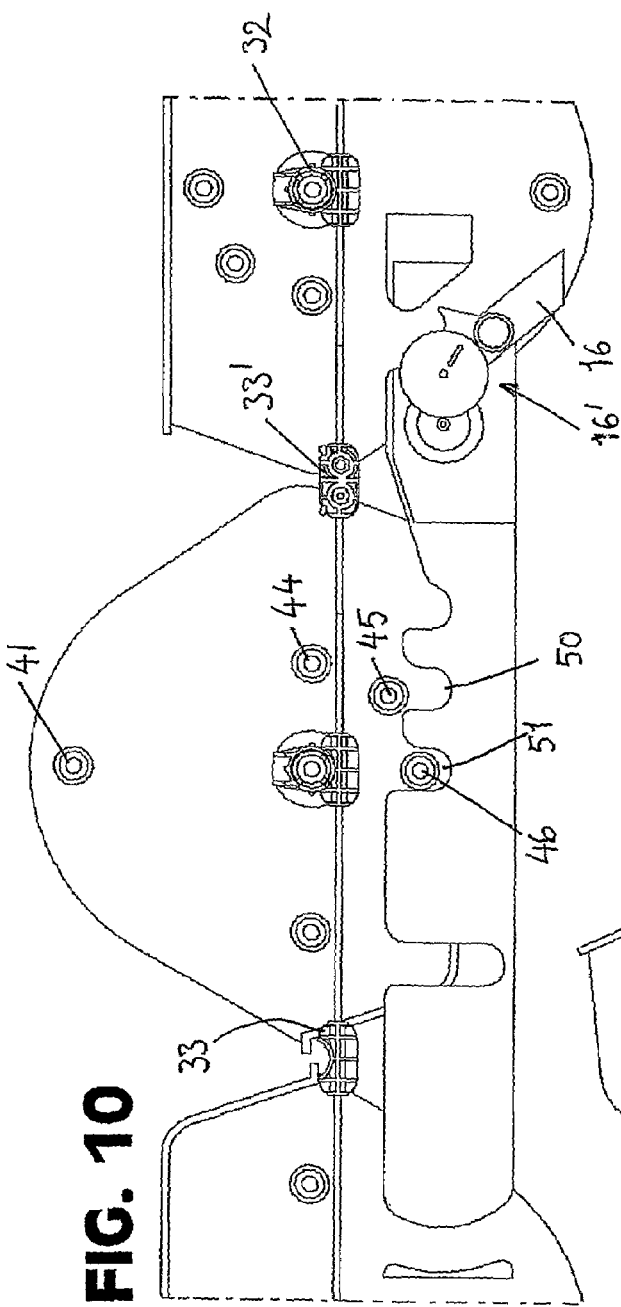

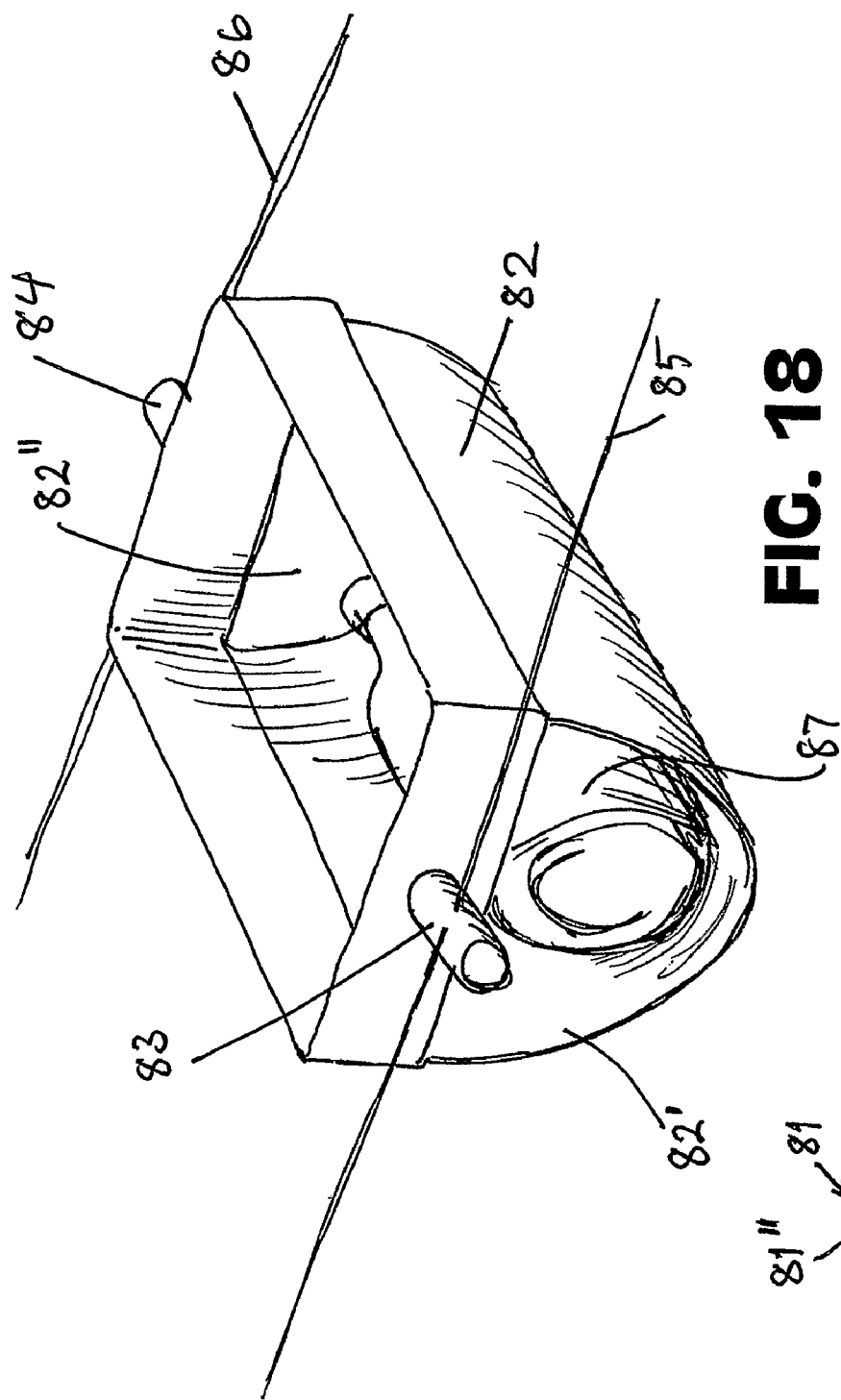

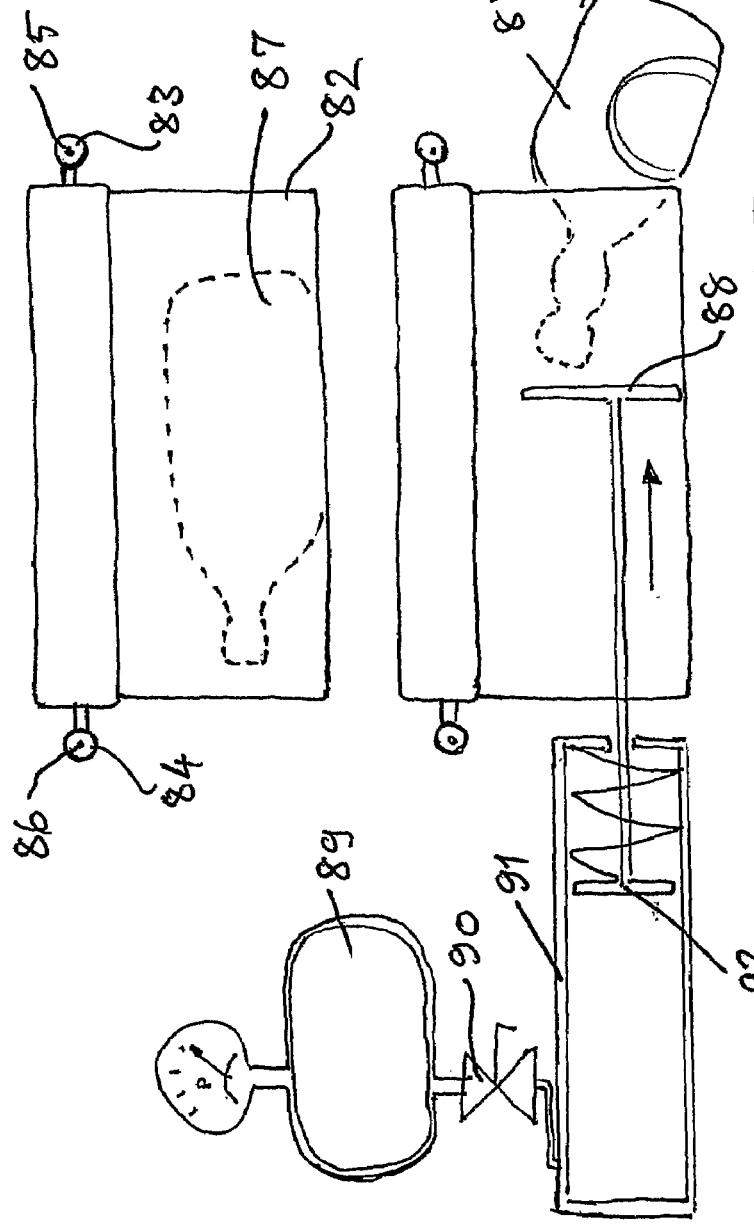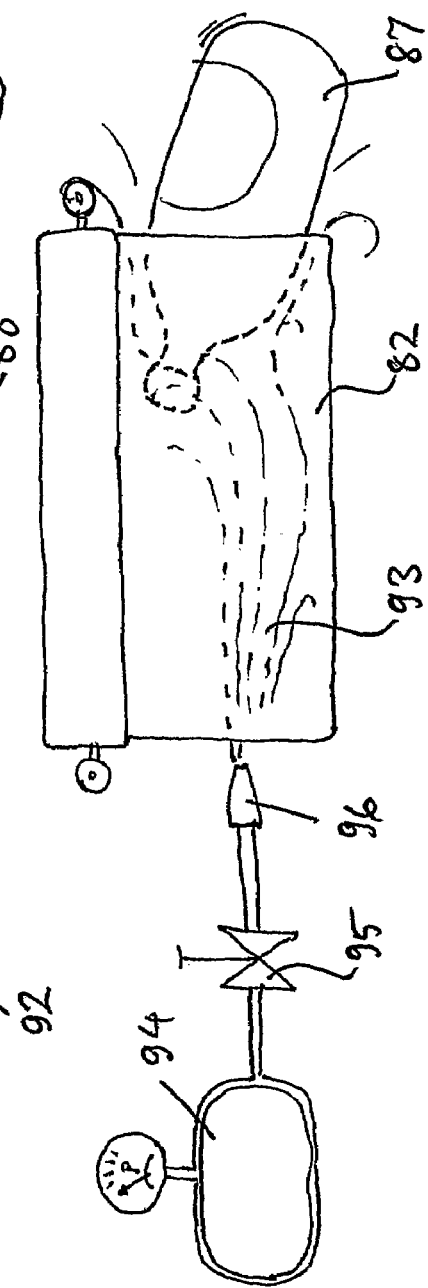

METHOD AND A DEVICE FOR TRANSPORTING IDENTIFIED PACKAGING UNITS

The present invention relates to a method and a device for individually transporting articles of different type, size, weight, material or shape, to one delivery location of a plurality of delivery locations that is designated for the respective article, as disclosed in more detail in the preambles of attached claims 1, 3, 4, 11, 13 and 14.

To illustrate the prior art, reference is made to patent documents DE-A1-4329193, U.S. Pat. No. 5,628,408, JP-A-7-185476, JP-A-10-000434, JP-10-174936, EP-B1-0212858, EP-B1-0532028, U.S. Pat. No. 4,465,177 and EP-A1-0593374.

There are also previously known solutions in which packaging units, after identification, are movable by conveyor belts to delivery points that have gates, movable guides, drop doors or the like to divert an identified packaging unit to a designated delivery point.

Such known solutions are often mechanically complex and thus costly, and it has been an object of the present invention to be able to indicate a solution that is based on a continuously moving conveying system which is readily adaptable to the need for delivery locations, and which is mechanically simple in its structure and consists of few parts of different types. Thus, the object of the invention is to provide a solution that is easy to maintain, reliable in operation and inexpensive.

According to the invention, the method comprises the steps as defined in the independent claims 1, 3 and 4.

Additional embodiments of the method are set forth in attached, subsidiary claims 2 and 5-10.

The aforementioned device comprises, according to the invention, the characteristic features as defined in the independent claims 11, 13 and 14.

Additional embodiments of the device are set forth in attached, subsidiary claims 12 and 15-20.

The invention will now be explained in more detail with reference to the attached figures which show exemplary embodiments that are non-limiting for the invention.

FIGS. 8-11 shows further details in connection with the inversion of a transport container.

FIG. 17 shows detail of this embodiment.

FIGS. 18 and 19 are respectively a sectional perspective view and a side view of a container according to a fourth embodiment of the device.

FIGS. 20 and 21 shows two alternative solutions for ejection of an article from a container as shown in FIGS. 18 and 19.

Figure 1:
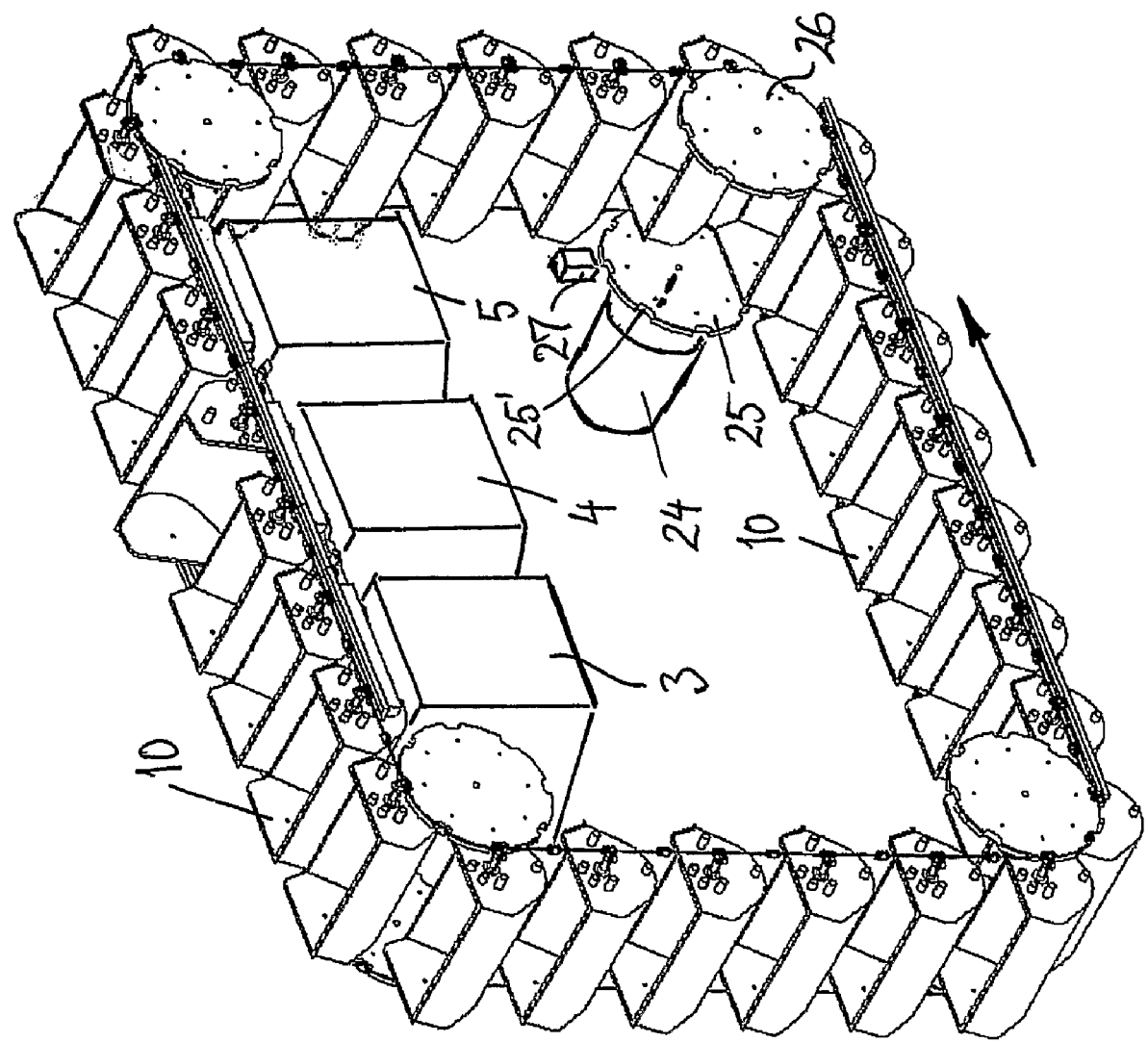
FIG. 1 is a perspective view of the basic structure of a currently preferred embodiment of the device according to the invention.
Figure 3:
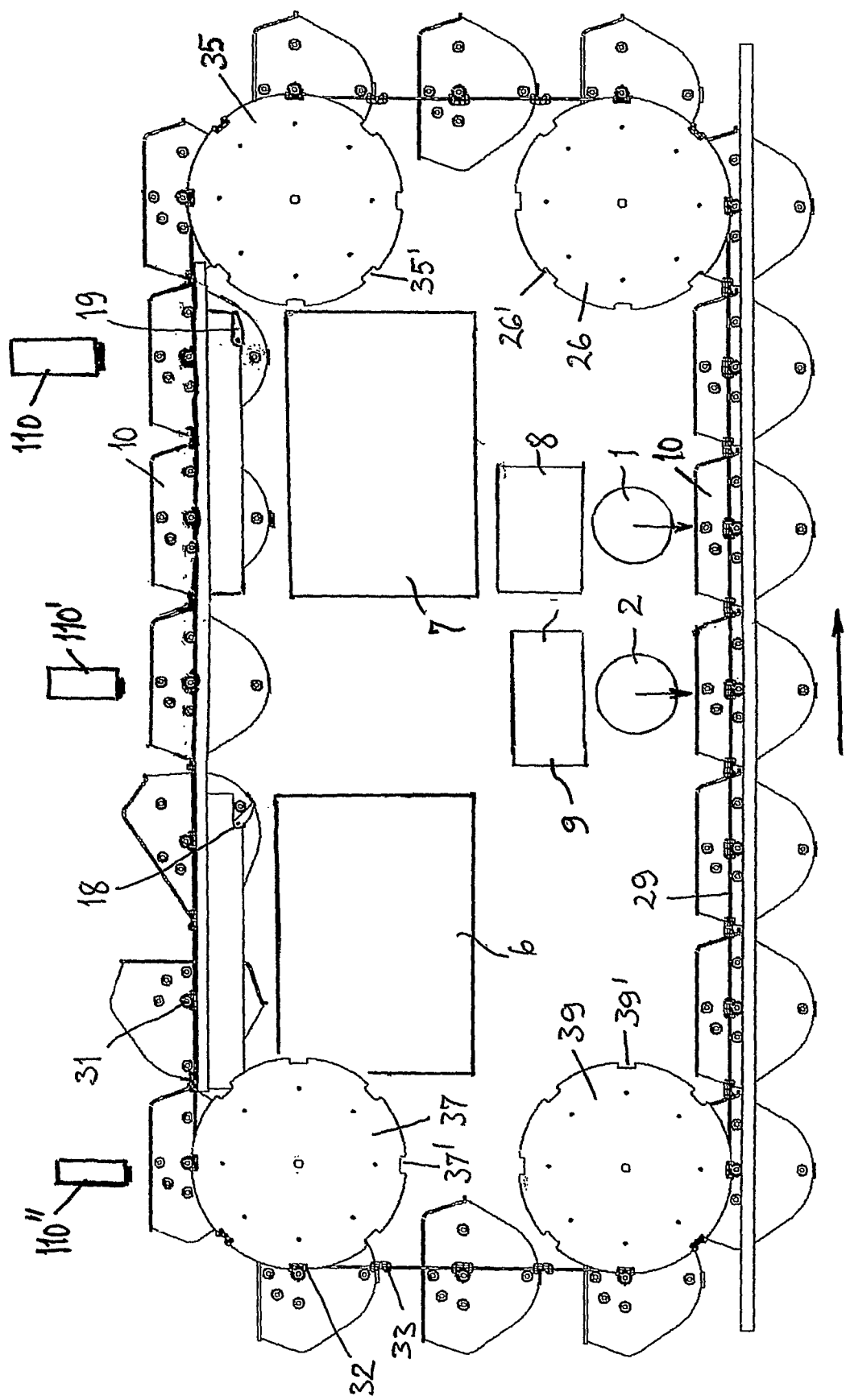
FIG. 3 is an enlarged, side elevational view of a modification of the device seen in FIGS. 1 and 2.
Figure 6:
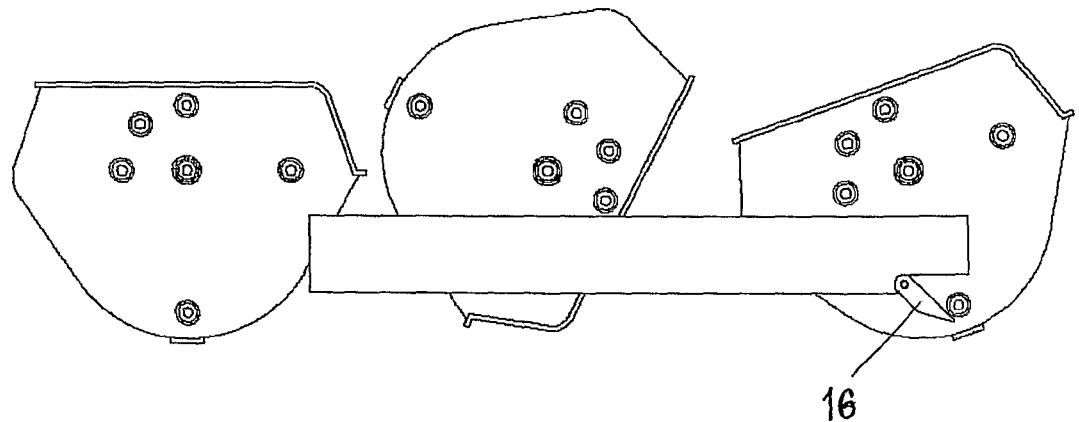
FIG. 6 shows detail of the device in connection with an activated control means.
Figure 7:
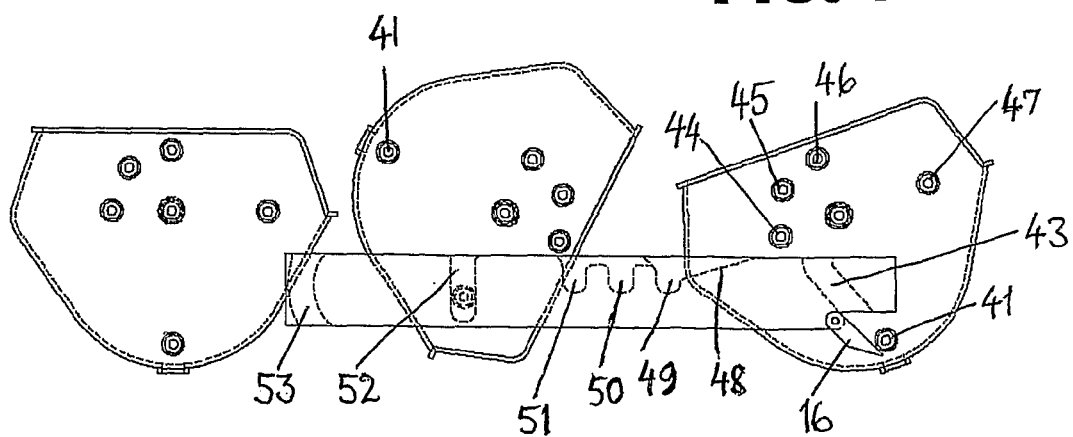
FIG. 7 shows further details in connection with a toothed engaging element for controlled inversion of a transport container.

The invention is designed to individually transport identified packaging units 1, 2 to a delivery location designated for the respective identified packaging unit, such as one of, for example delivery locations 3, 4 or 5 shown in FIG. 1 or 6, 7 shown in FIG. 3. Although only two container feed locations 8, 9 are shown, it will be understood that there may be more than these two, but optionally just one.

Figure 2:
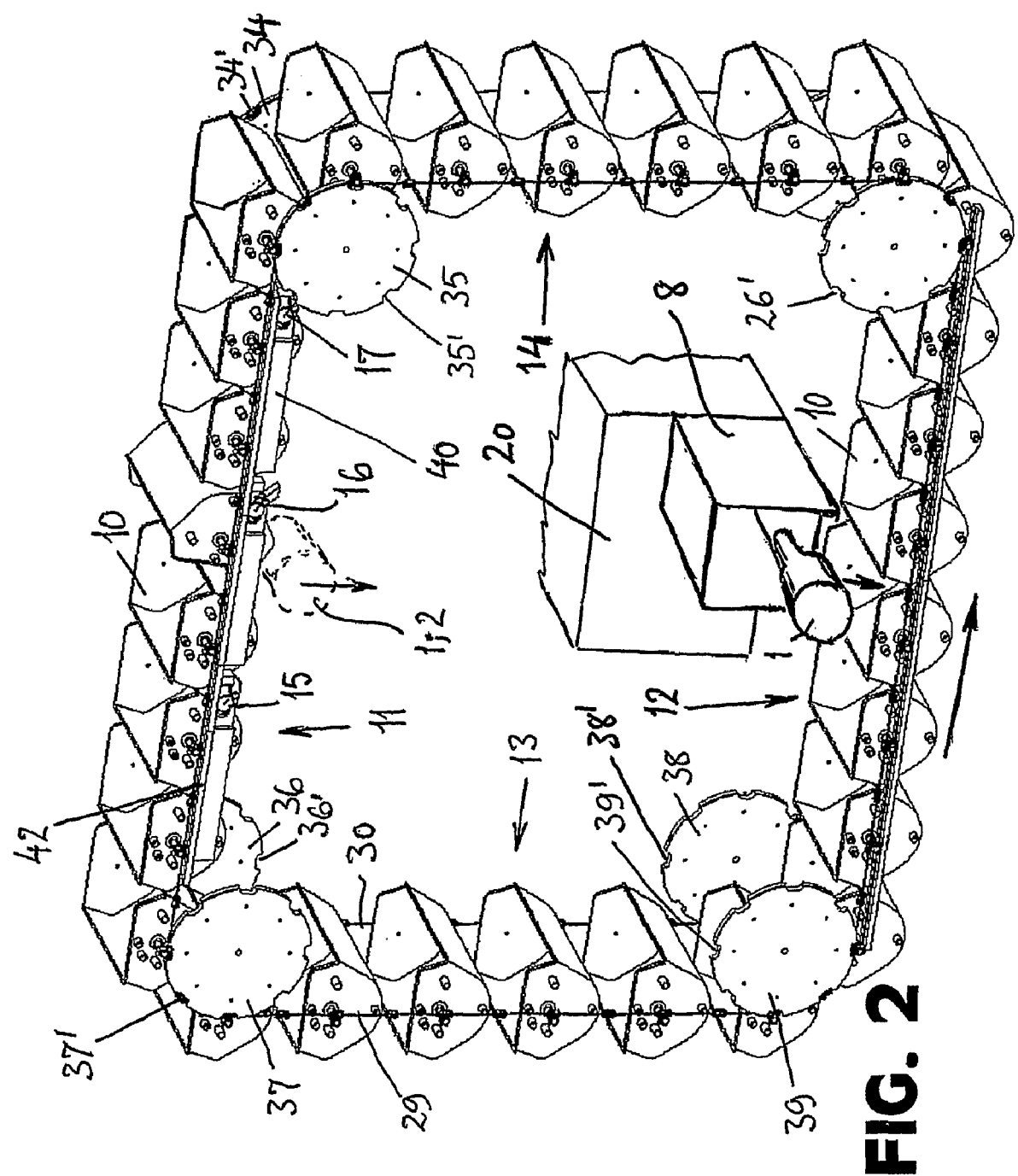
FIG. 2 is a perspective view of the device from another angle.

FIGS. 1-3 show a plurality of bucket-shaped or trough-shaped transport containers 10. The containers 10 are arranged to move as a endless row in a certain spaced apart relation along a circular path, having both two horizontal sections 11, 12 and two vertical sections 13, 14; cf. FIG. 2.

The control means 15, 16, 17 (FIG. 2) or 18, 19 (FIG. 3) is positioned at respective generally indicated delivery locations 3, 4, 5 or 6, 7. These delivery locations may, for example, consist of a dedicated collecting or storage bin, disintegrator or further conveyor.

When a packaging unit, as for instance a bottle 1 or a beverage can 2 is inserted into a reverse vending machine 20 on a conveyor 21, the packaging unit will be detected by detector device 22, and detector device 22 will communicate with a signal processing unit 23. The detector device 22 may be a known type and designed to detect, for example, one or more of the following parameters: the material of the packaging unit, for example, using spectrometry; colour; shape, reading of characteristics, for example, optically, magnetically, using RF technology or the like; weight; type of metal or presence of metal. Referring to FIG. 1, the unit 23 will selectively activate one of the control means 15-17 via a respective signal line 15', 16' or 17', so that the discharging of the packaging unit 1, 2 from a container 10 can take place at the desired delivery location by rotation of the container 10, as will be explained in more detail. The unit 23 also communicates with a drive motor 24 that is arranged to operate drive wheels 25, 26 (see FIG. 1). A detector 27 that is connected to the unit 23 detects rotation of the drive wheels 25, 26 and is thus also provided with information about the rotational position of the drive wheels and thus the respective position of the containers 10 in the path. The unit 23 is also arranged to be able to communicate with an operating and display panel 28 on the reverse vending machine.

The transport containers 10 are arranged to be moved along the path using a chain or line, generally indicated by the reference numerals 29, 30. The containers have a bearing pin on each gable thereof, and this pair of pins is axially aligned and rotatably supported in holders 32 on the respective chain or line. The chains or lines 29, 30 are driven purely generally by drive wheels 25. 26 controlled by the motor 24, the holders 32 together with additional position holders 33 forming successive engagement with recesses 25', 26' on the drive wheels for controlled propulsion of the containers 10 as the drive wheels rotate. The said holders 32, 33 on the chains or lines are also arranged for successive cooperation with corresponding recesses 34', 35'; 36', 37' and 38', 39' on at least three pairs of guide wheels or reversing wheels 34, 35; 36, 37 and 38, 39.

The holder 33', see FIG. 10, has the same function as a holder 33, but is shown here as a connecting piece-configured holder.

The signal processing unit 23 will, in response to detected and identified packaging unit 1, 2, move an associated control means 15-17, 18, 19 into activated position, and the associated delivery location is thus related to the identified packaging unit that is placed in a container 10.

Figure 5:
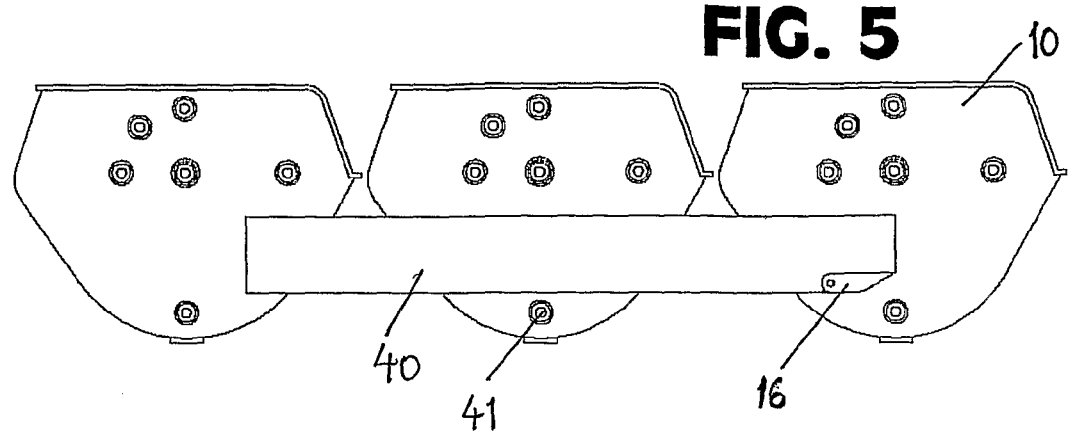
FIG. 5 shows detail of the device in connection with a non-activated control means.
Figure 8:
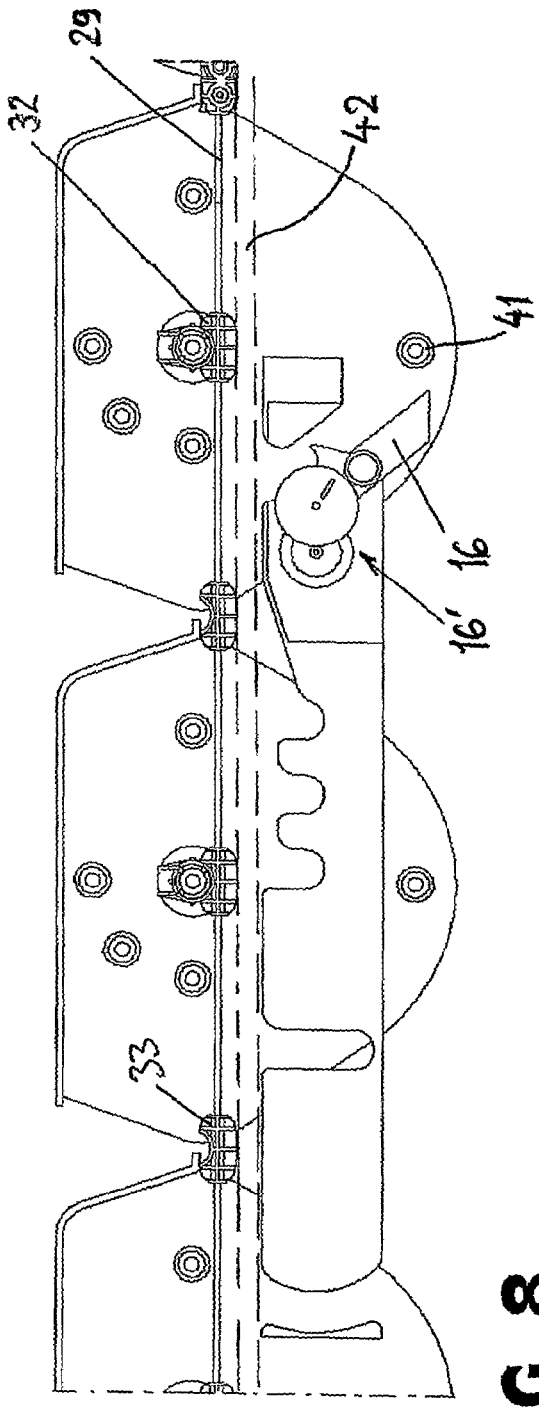
Figure 9:
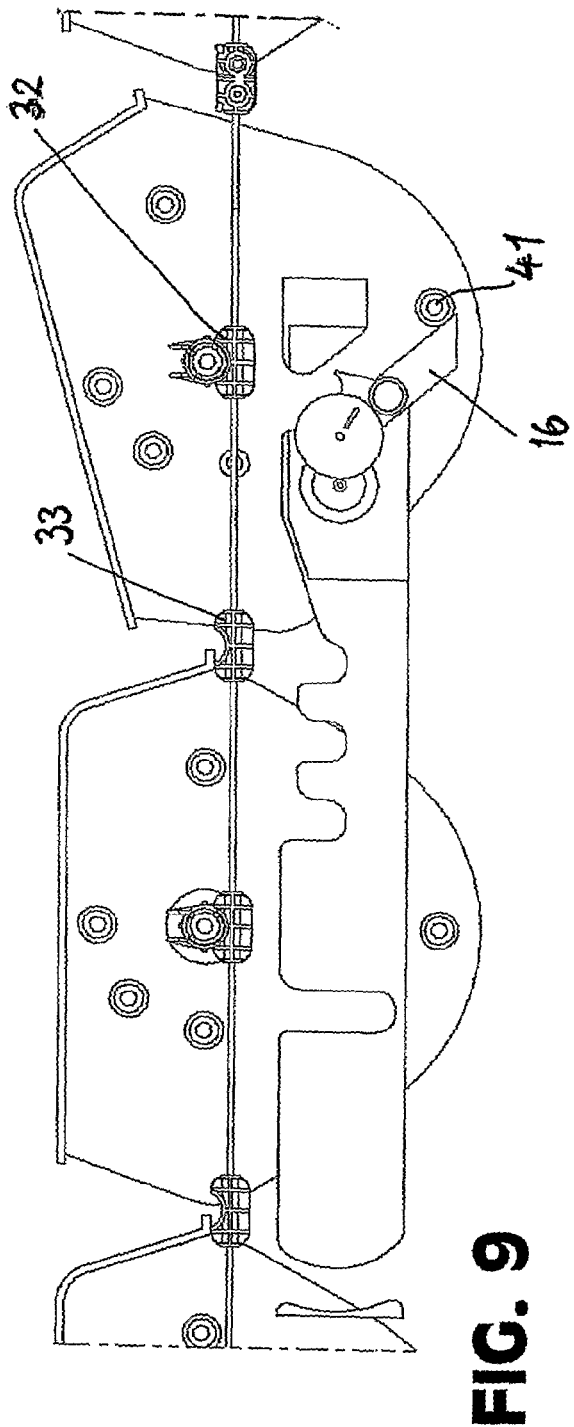
Figure 12:
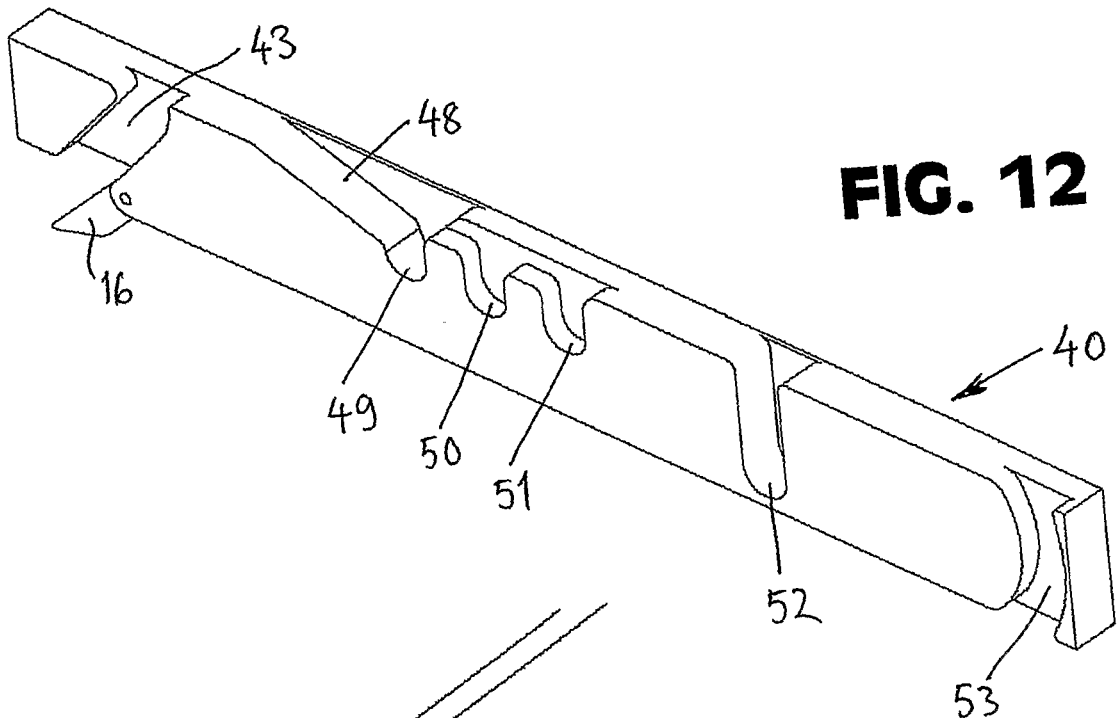
FIG. 12 is a perspective view of the toothed engaging element.
Figure 13:
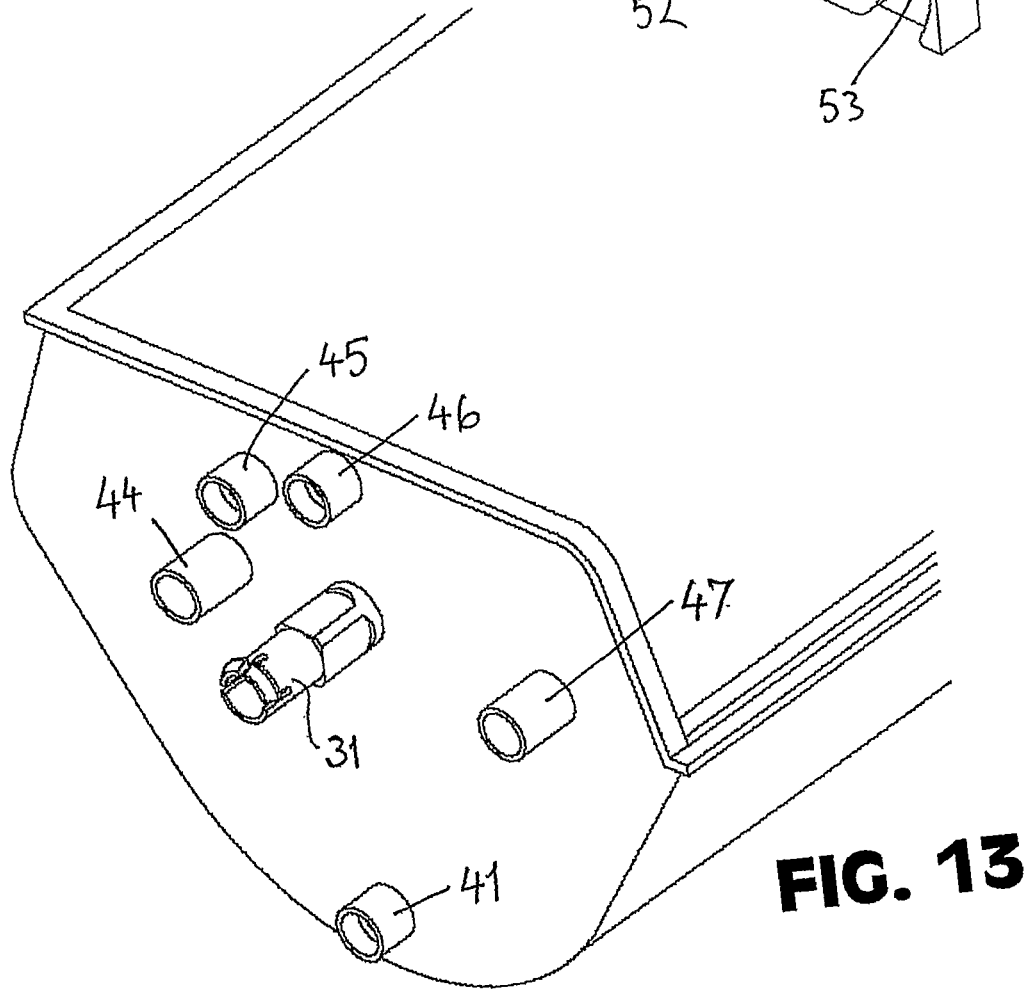
FIG. 13 is a perspective view of detail of bearing and guide pins on a transport container.

In FIG. 5 it is shown how containers 10 will be able to pass a sorting means, in this figure, for example, the means 16, when this has not been activated, and also be able to pass unactuated by a toothed engaging element 40, i.e., so that the containers are not permitted to turn because of a guide pin 41 that is found on both gables of the container and which remains in place along the underside of an element 40 on each side of the path. A guide strip 42 on which the holders 32 are arranged to slide in the horizontal parts of the path, as indicated in FIGS. 1 and 8, is for the sake of simplicity not included in FIGS. 6, 7, 9-11. The holders 32, 33 and drive chain or line are also not included in FIGS. 5-7.

In FIG. 6 and also especially in FIG. 7 it is shown what happens when the means 16 is activated to cause a container to be inverted so as to discharge a packaging unit placed therein. The means 16 consists of a guide flap that is arranged to cooperate with the guide pin 41 which is a part of engaging means mounted on the gables of the container 10. The guide flap 16 is preferably controllable by a small motor 16'. When the container 10 at the same time is driven forwards in the path by the drive wheels 25, 26, the pin 41 will cooperate with the flap 16 and then with a slot 43 located downstream in the element 40. A turning of the container 10 is thus already underway. Additional guide pins 44-47 that are a part of the engaging means on the container 10 will successively engage with the engaging element 40. First the pin 40 will slide down along an inclined plane 48 and enter engagement with a recess 49. Then the pin 45 will enter the recess 50, whereupon the pin 46 enters the recess 51, whilst the pins 44, 45 are already in the process of moving out of their respective recesses. The pin 47 subsequently engages with a recess 52, whereupon the pin 41 ultimately passes through a slot 53 on the element 40. A forcibly controlled 360° rotation of the container 10 has thus been carried out.

In this way, it will be possible to invert the container controllably so as to tip the identified packaging unit 1; 2 lying in the container out of the container under the effect of gravity at its designated delivery location.

Figure 14:
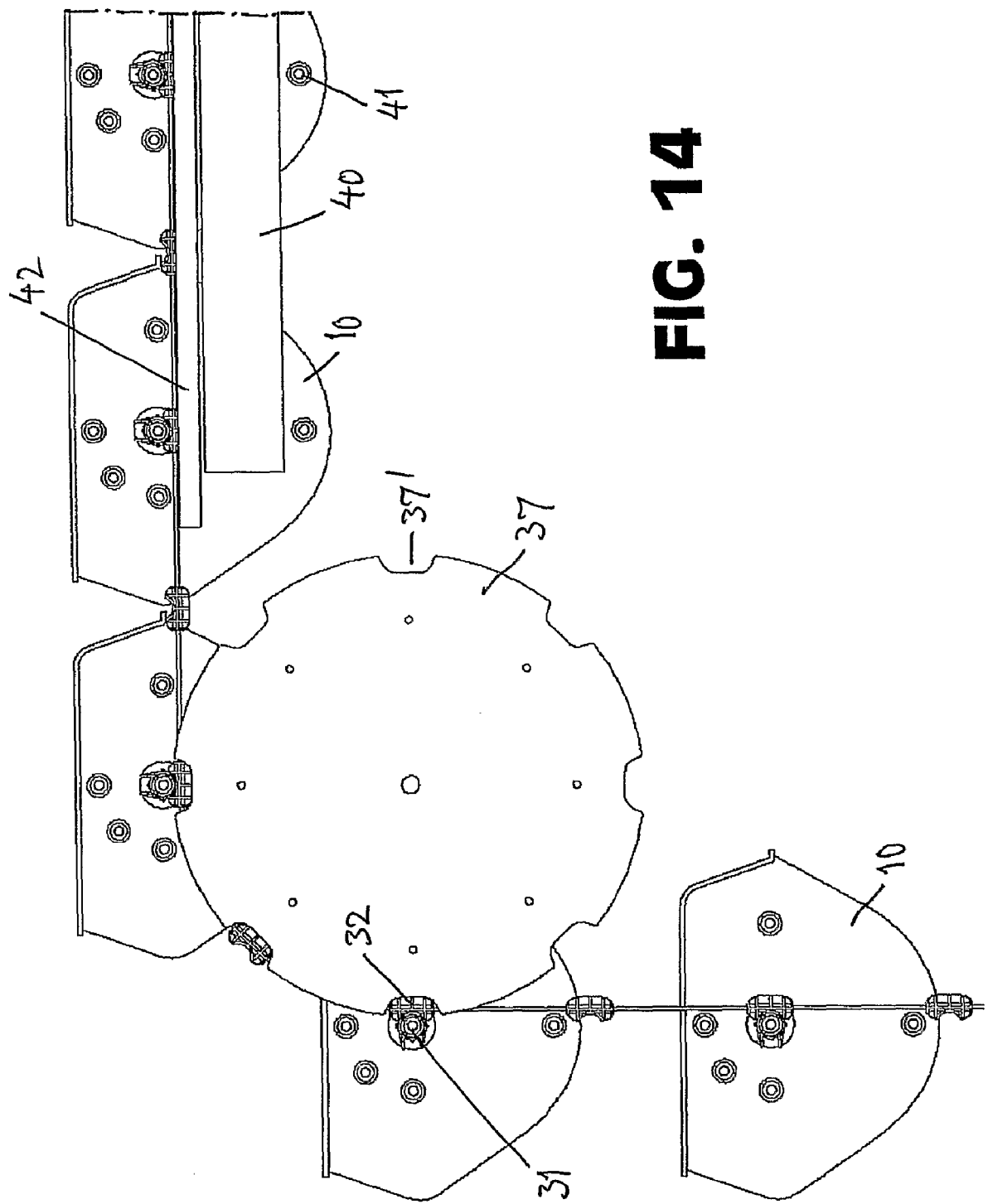
FIG. 14 is a sectional view of the device in connection with the transition from horizontal to vertical movement of transport containers.

When the containers 10 are moved vertically, as shown in an enlarged view in FIG. 14, the containers will, because their bearing point via the bearing pin 31 in the holder 32 lies above the centre of gravity of the container, prevent rotation of the container.

It will be seen that the containers are supported in said chains or lines in a fixed spaced apart relation, as the spacing between, inter alia, the holders 32 is the same along the whole path. However, the spacing between the containers will vary slightly when, for instance, inversion takes place or when they are moved in the vertical part of the path.

In the solution shown in FIGS. 1-14 it is seen that the transport container 10 is a partly open container, e.g., bucket-shaped or trough-shaped, in order that, at the designated delivery point 3, 4, 5, 6 or 7, it can be made to invert so as to discharge the article 1; 2 under the effect of gravity.

Figure 15:
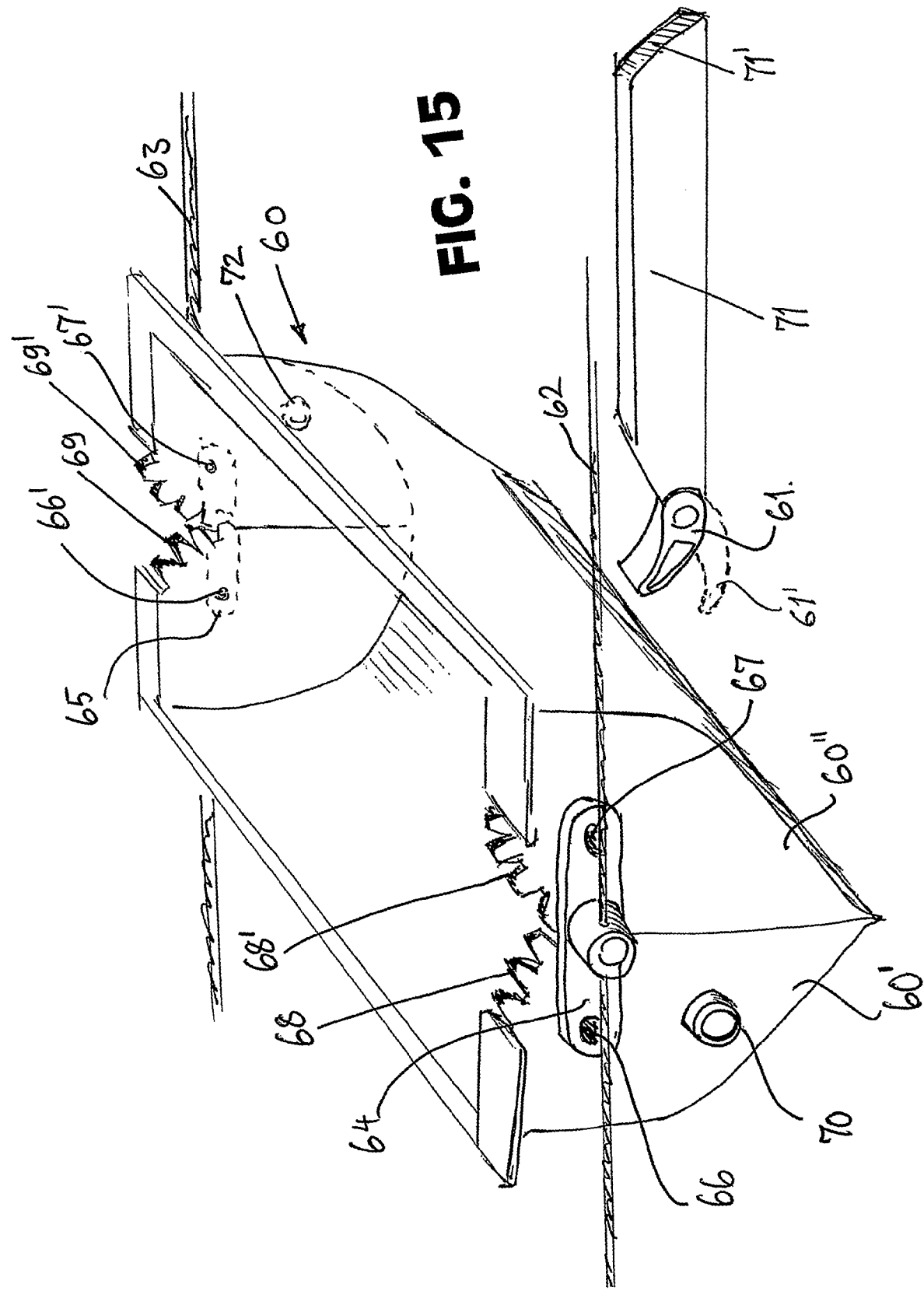
FIG. 15 is a sectional, perspective view of the principle of the mode of operation of a second embodiment of the device according to the invention.

FIG. 15 shows a solution in which an article may be discharged from a transport container 60 by gravity when an actuating means 61 is activated to cause the transport container bottom to open in that that two parts 60', 60" of the container move apart. The transport container 60 is suspended from a pair 62, 63 of lines or chains via suspension fitting mounting 64, 65. The two parts 60', 60" are rotatably fastened to the fittings 64, 65 at pivot points 66, 66' and 67, 67'. The two parts 60', 60" are rotatably interacting with the aid of toothed portions 68, 68'; 69, 69'. The actuating means 61 is movable downwards to a 61' where it will enter sliding engagement with an actuating pin 70 on the part 60'. By letting the pin rides on the actuating means 61, the pin will be made to gradually move upwards along the means 61 and then along the upper side of a stationary pin-slide 71. At a downstream end 71' of the slide 71, the pin 70 moves downwards again, whereby the two parts 60', 60" move towards each other. Similarly, on the part 60" at the opposite end of the container 60 there will be provided an actuating pin 72 that is designed to ride on a stationary pin-slide (not shown) which is located downstream of the slide 71. In connection with this non-illustrated slide it is not necessary to have an actuating means, like the means 61, as the rotation of the part 60' also causes forced rotation of the part 60" via the toothed portions 68, 68' and 69, 69'.

Figure 16:
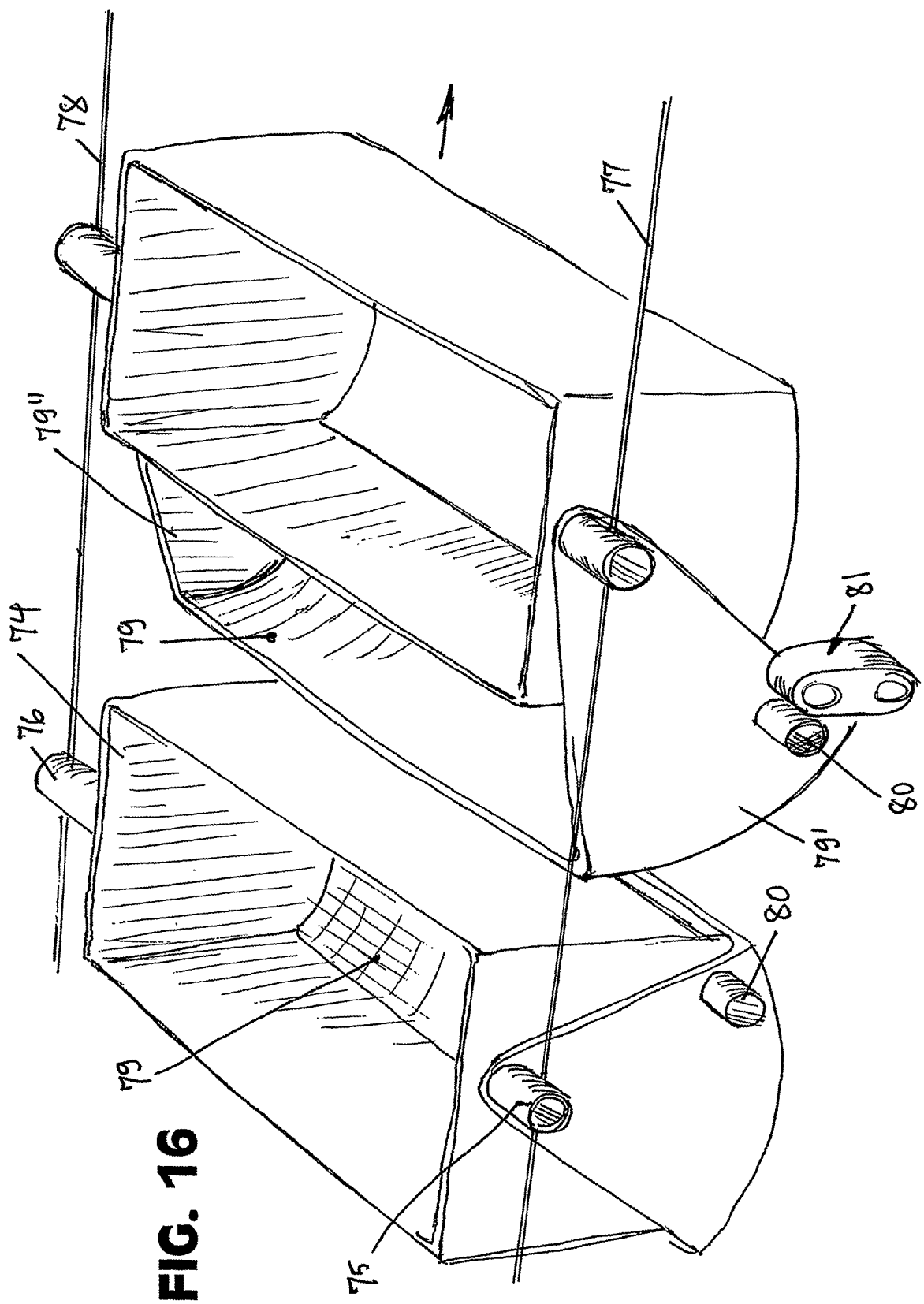
FIG. 16 is a sectional, perspective view of the principle of the mode of operation of a third embodiment of the device according to the invention.

FIGS. 16 and 17 show a container 74 which via suspension 75, 76 is fastened to a pair of transport lines or chains 77, 78. The container has a laterally rotatable bottom part 79 which is preferably supported in said suspension 75, 76 via end pieces 79', 79". One of the end pieces, e.g., 79', is provided with an engaging pin 80 arranged to engage with an actuating lug 81 which, as shown in FIG. 17, is movable from an inactive position 81' to an active position 81". When the containers move in the direction of the arrow and the lug 81 is put in the active position, the pin 80 will abut against the lug 81 and cause the bottom 79 to be pushed sideways relative to the length of the container 74, whereby an article in the container will fall out under the effect of gravity. When the containers have moved sufficiently in the direction of the arrow, the pin 80 will ultimately slide over the top of the lug 81, whereupon the bottom 79 will return to a normal position as shown for the container to the far left in FIG. 16.

FIGS. 18 and 19 show another solution in which the container 82 has an opening 82', 82" at both ends. The container is via suspension 83, 84 suspended from lines or chains 85, 86. When it is desirable at a designated location to remove an article 87, e.g., a bottle, from the container 82, an ejector mechanism can be used to push the article out of the container. Such an ejector mechanism may, e.g., be a quick-acting electrically (e.g., solenoid) or pneumatically operated device with a pusher 88. FIG. 20 shows a pneumatic ejector mechanism with a pressure source 89, control valve 90, and pneumatic cylinder 91 with associated, spring-loaded piston 92. In the alternative solution shown in FIG. 21, it is envisaged that a powerful high-pressure air stream 93 is used which comes from a pressure source 94 via control valve 95 and a nozzle 96.

Figure 22:
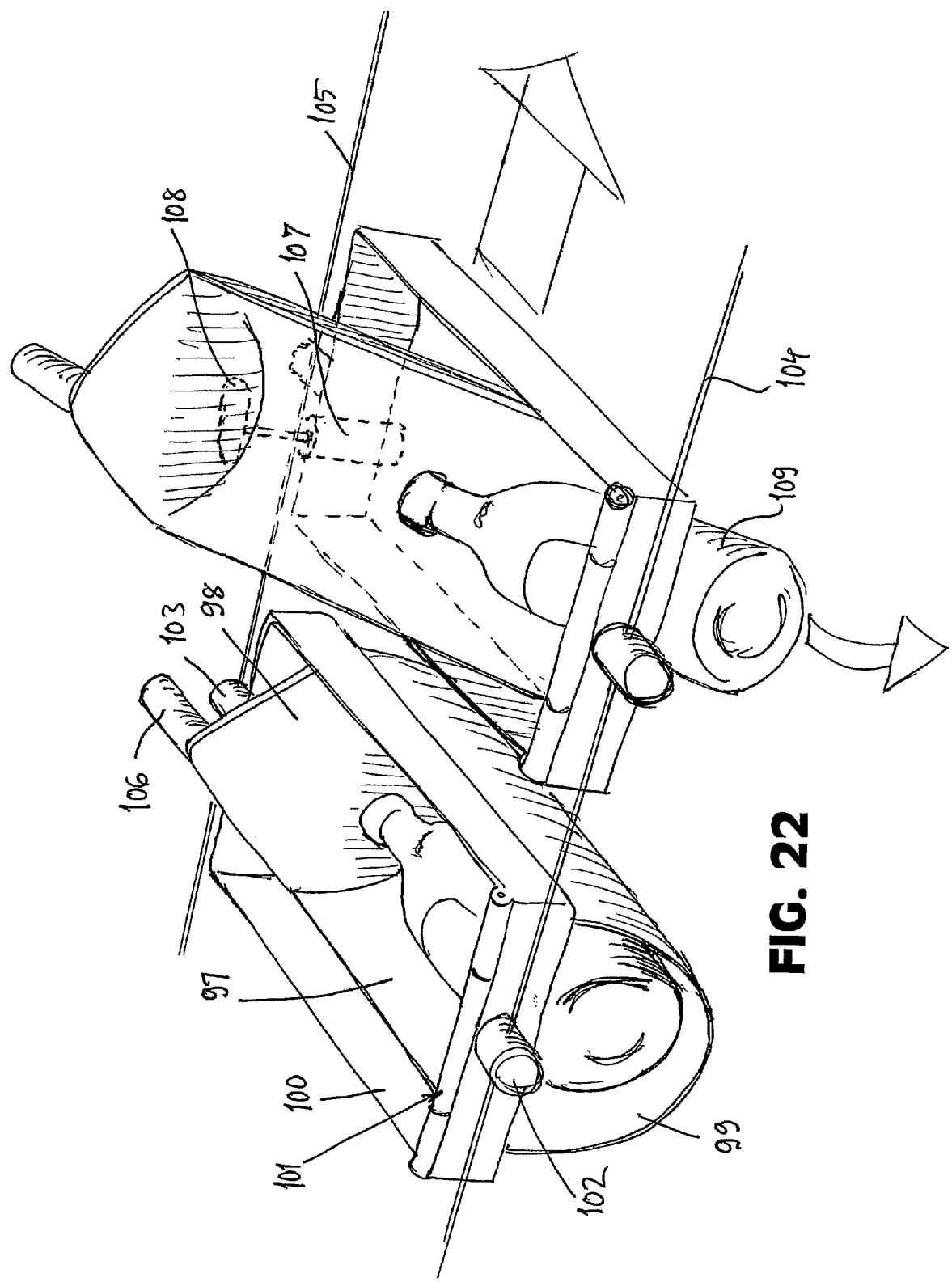
FIG. 22 is a sectional, perspective view of the principle of the mode of operation of a fifth embodiment of the device.

In the solution shown in FIG. 22 a container 97 is provided that is closed at one end 98 and open at the other end 99. The container 97 is pivotally fitted to a container support frame 100 at the open end 98 of the container via a hinge 101. The support frame 100 is via suspension 102, 103 fastened to a pair of lines or chains 104, 105. Secured to the outside of the end 98 of the container, which consists of an end gable, is a projecting engaging pin 106. On actuation of an electric or pneumatic quick-acting actuating means 107 which has a pusher 108, the container 97 will, upon the sharp "kick" of the pusher on the pin 106 in the upward direction, be caused to tilt about the hinge 101, whereby the article, e.g., a bottle 109, will slide out of the container 97 via the opening 99 at the desired discharge location.

Figure 4:
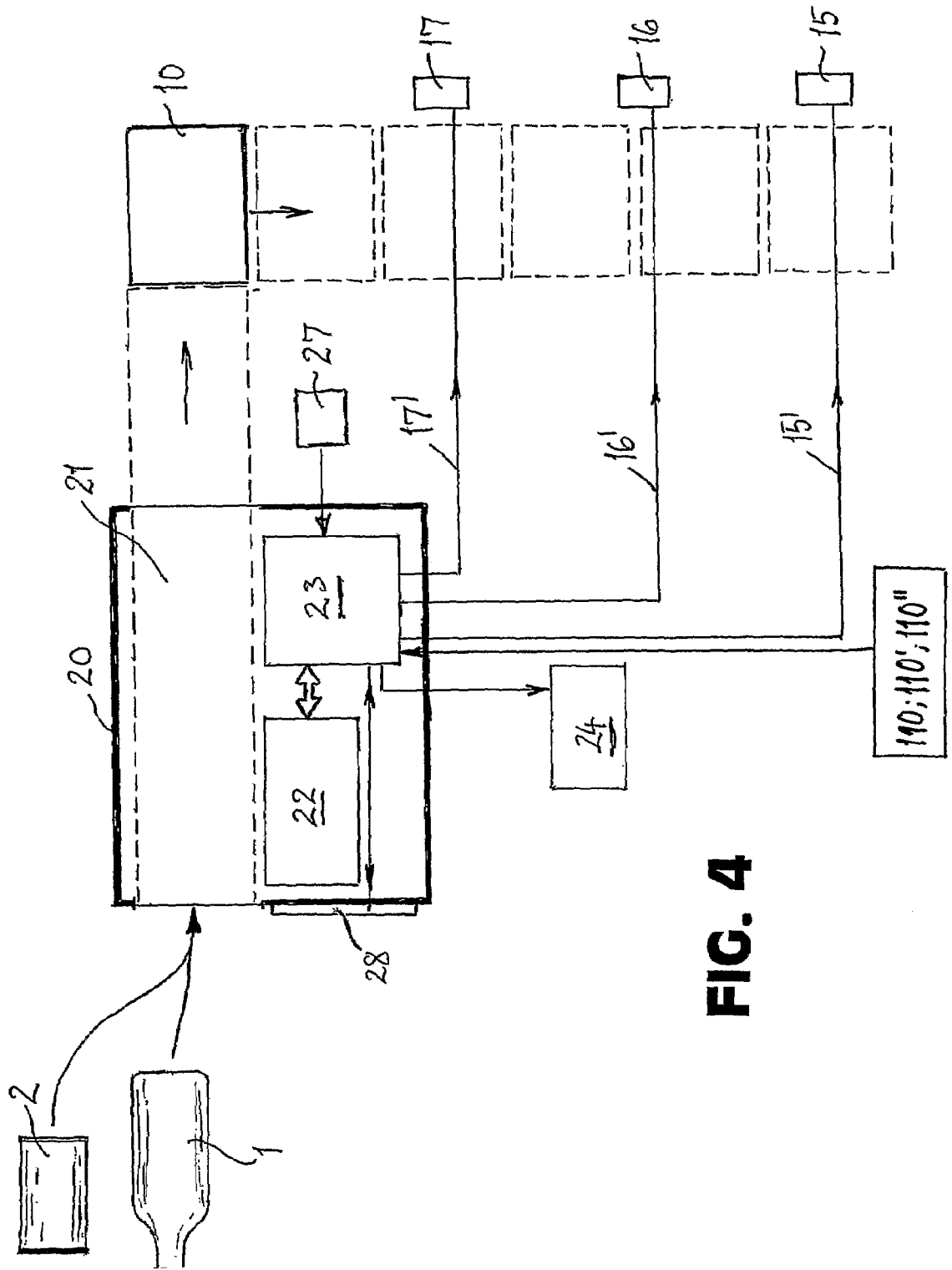
FIG. 4 is a block diagram of the signal structure of the device according to the invention.

In FIG. 3 it is shown how, for example, at least one camera 110; 110'; 110" may be mounted above the transport path to cooperate with an article recognition means to establish one of the following features: that just one article is in the dedicated transport container, that the transport container is emptied at the desired article delivery location, that the article is not a strange article, and that the article is in a unitary state. It is also possible to envisage that such a camera is capable of identifying the article whilst it is in the transport container, for example, as regards material type. FIG. 4 shows how connection may be made to a signal processing unit.

From the above description and from the drawings it will be clear, inter alia, that the transport container in a controllable manner is temporally actuated to discharge an article that is located therein. The transport containers preferably move at a constant speed in a circular path of movement with adjacent containers preferably spaced apart at a fixed distance, as an endless moving row of containers. Such a circular path has both horizontal and vertical portions.

Although it is basically possible to envisage the invention used for the transport and discharge of several types of articles, the articles according to a preferred use of the invention are empty packaging units, e.g., cans of metal or plastic, or bottles of plastic or glass.

The invention claimed is:

1. A method for individually transporting articles of different type, size, weight, material or shape, to one delivery location of a plurality of delivery locations that is designated for the respective article, comprising:
   providing a plurality of article transport containers with a container opening through which an article is discharged,
   arranging the transport containers to move successively in spaced relationship from each other along all points of a predetermined transport path with the container opening of each container normally positioned in an upwardly facing direction,
   providing each transport container with a respective axis of rotation, to permit controlled rotation of selected ones of the transport containers,
   identifying each article as regards its type of material,
   placing the identified articles one by one in respective transport containers,
   providing television camera inspection of the articles one by one from a location above the transport path of the articles,
   establishing via the camera inspection that just one article is placed or is present in a respective dedicated transport container,
   designating a delivery location for discharge of a contained article from its transport container,
   causing the respective article at its designated delivery location to be discharged from its transport container to a collecting or storage bin, disintegrator or further conveyor dedicated to the article by rotating the transport container about its axis of rotation in one direction from the normal container position, to beyond the point of article and back discharge to the normal container position without contacting any other container during such rotation to enable said discharge of the article from the container opening to be made under the effect of gravity.

2. A method according to claim 1, wherein the transport container at the designated delivery location is made to invert in the course of rotating the container through an angle of 360° about an axis of rotation so as to discharge the single article from the container under the effect of gravity.

3. A method for individually transporting articles of different type, size, weight, material or shape, to one delivery location of a plurality of delivery locations that is designated for the respective article, comprising:
   providing a plurality of article transport containers with a container opening through which an article is discharged,
   arranging the transport containers to move successively in spaced relationship from each other along all points of a predetermined transport path with the container opening of each container normally positioned in an upwardly facing direction,
   providing each transport container with a respective axis of rotation, to permit controlled rotation of selected ones of the transport containers,
   identifying each article as regards its type of material,
   placing the identified articles one by one in respective transport containers,
   designating a delivery location for discharge of a contained article from its transport container,
   discharging the respective article at its designated delivery location from its transport container to a collecting or storage bin, disintegrator or further conveyor dedicated to the article, said discharging provided by inverting the transport container by rotating the container in one direction through an angle of 360° about its axis of rotation without contacting any other container so as to discharge the single article from the container opening under the effect of gravity.

4. A method for individually transporting articles of different type, size, weight, material or shape, to one delivery location of a plurality of delivery locations that is designated for the respective article, comprising:
   providing a plurality of article transport containers with a container opening through which an article is discharged,
   arranging the transport containers to move successively in spaced relationship from each other along all points of a predetermined transport path with the container opening of each container normally positioned in an upwardly facing direction,
   providing each transport container with a respective axis of rotation, to permit controlled rotation of selected ones of the transport containers,
   identifying each article,
   placing identified articles one by one in respective transport containers,
   designating a delivery location for discharge of a contained article from its transport container,
   discharging the respective article at its designated delivery location from its transport container to a collecting or storage bin, disintegrator or further conveyor dedicated to the article, said discharging provided by inverting the transport container by rotating the container in one direction through an angle of 360° about its axis of rotation without contacting any other container so as to discharge the single article from the container opening under the effect of gravity,
   controlling the rotation of the transport container by providing a plurality of guide pins on the container, and a selectively controllable guide flap at the delivery location, and a stationary toothed engaging element at the delivery location,
   causing an initial turning of the container by engaging at least one of the guide pins, with the selectively controllable guide flap, and causing further controlled rotation of the container by engaging at least one further guide pin on the container with the stationary toothed engaging element at the delivery location.

5. A method according to claim 1, wherein further television camera inspection of the transport containers includes at least one of:
  i) determining that discharging of an article at designated article delivery location causes the transport container to be fully emptied,
  ii) determining that the article is not a strange article, and
  iii) determining that the article is in a unitary state when in its container.

6. A method according to claim 1, wherein said television camera inspection is made from a location above the transport path of the articles.

7. A method according to claim 2, wherein rotation of the transport container is performed in a controllable manner and temporally actuated by force.

8. A method according to claim 1, wherein the transport containers are prevented from rotation in horizontal portions of the circular path, except at the designated article delivery location related to a specific container, by allowing guide pins on both sides of the container to form anti-rotation supports.

9. A method according to claim 2, wherein the rotation of the transport container is controlled by a plurality of guide pins on the container, where at least one of the guide pins, on cooperation with a movable and selectively controllable guide flap mounted at the delivery location, causes an initial turning of the container, and wherein at least one further guide pin on the container in cooperation with a stationary toothed engaging element at the delivery location causes controlled rotation of the container.

10. A method according to claim 1, wherein the articles to be identified, inspected, transported one by one and discharged, are empty packaging units being at least one from the group of cans of metals cans of plastic, bottles of plastic, and bottles of glass.

11. A device for individually transporting articles of different type, size, weight, material or shape to one delivery location of a plurality of delivery locations that is designated for the respective article, comprising:
  an endless transport path traversing a plurality of delivery locations,
  a plurality of article transport containers being arranged to move successively in spaced apart relation from each other along all points of the transport path as an endless, moving row of containers, movable past the plurality of delivery locations,
  means for placing articles, one by one, in respective transport containers,
  an article recognition means at a first location proximate the transport path for identifying each article as regards its type of material prior to a location at which the articles are to be placed one by one in a respective transport container to yield only one article per container;
  at least one television camera which is located at a second location proximate the transport path to inspect the articles one by one to establish that just one article is placed or is present in a respective dedicated transport container;
  a container actuating means for causing removal of an article from its container, mounted at each of said plurality of said delivery locations, respective ones of said actuating means having one state capable of entering into activated position related to a designated delivery location for an identified article, to cooperate with a respective transport container so as to cause removal of the identified article from its container at its designated delivery location, said respective ones of said actuating means having a second state controllable to be in an inactive position to selectively allow a container to pass the delivery location related to said respective actuating means without causing removal of article from container when a container contains an article not designated for delivery thereat; and wherein the transport container at a delivery location designated for an article is arrange to cooperate with a means at the delivery location for emptying the transport container in the course of rotating the container through a 360 degree angle about an axis of rotation thereof so as to discharge the article under the effect of gravity.

12. A device for individually transporting articles of different type, size, weight, material or shape to one delivery location of a plurality of delivery locations that is designated for the respective article, comprising:
  an endless transport path traversing a plurality of delivery locations,
  a plurality of article transport containers each having an axis of rotation and an opening through which an article is discharged, and being oriented such that the container opening is normally positioned in an upwardly facing direction, the transport containers being arranged to move successively in spaced apart relation from each other along all points of the transport path as an endless, moving row of containers, movable past the plurality of delivery locations,
  means for placing articles, one by one in respective transport containers,
  an article recognition means at a first location proximate the transport path for identifying each article as regards its type of material prior to a location at which the articles are to be placed one by one in a respective transport container to yield only one article per container;
  a container actuating means for discharging the respective article at its designated delivery location from its transport container to a collecting or storage bin, disintegrator or further conveyor dedicated to the article,
  said container actuating means for discharging the respective article further including means for causing the transport container to rotate in one direction through an angle of 360° about its axis of rotation, without contacting any other container, so as to discharge the single article from the container opening under the effect of gravity.

13. A device for individually transporting articles of different type, size, weight, material or shape to one delivery location of a plurality of delivery locations that is designated for the respective article, comprising:
  an endless transport path traversing a plurality of delivery locations,
  a plurality of article transport containers each having an axis of rotation and an opening through which an article is discharged, and being oriented such that the container opening is normally positioned in an upwardly facing direction, the transport containers being arranged to move successively in spaced apart relation from each other along all points of the transport path as an endless, moving row of containers movable past the plurality of delivery locations,
  means for placing articles, one by one, in respective transport containers,
  an article recognition means at a first location proximate the transport path for identifying each article as regards its type of material prior to a location at which the articles are placed one by one in respective transport containers to yield only one article per container;

a container actuating means for causing discharge of a respective article at its designated delivery location from its transport container to a collecting or storage bin, disintegrator or further conveyor dedicated to the article, said container actuating means further including means for inverting the transport container by rotating the container in one direction through an angle of 360° about the axis of rotation without contacting any other container so as to discharge the single article from the container opening under the effect of gravity, said container actuating means further including a plurality of guide pins on the container, a movable guide flap at the delivery location movable to an engagement position, and a stationary toothed engaging element at the delivery location for controlling the rotation of the transport container, at least one of the guide pins being engageable with the movable guide flap at the delivery location, when the guide flap is moved to the engagement position to cause an initial turning of the container, and at least one additional guide pin on the container being configured to co-operate with the toothed engaging element at the delivery location to effect further controlled rotation of the transport container.

14. A device according to claim 11, wherein the transport containers have guide pins on both sides of the container which form anti-rotation supports in at least parts of the horizontal portions of the transport path.

15. A device according to claim 11, including a stationary toothed engaging element at each delivery location, wherein a plurality of guide pins are provided on the container for controlling the rotation of the transport container, wherein at least one of the guide pins is arranged, upon cooperation with said actuating means in the form of a moving guide flap located at the delivery location, to cause an initial turning of the container, and wherein at least one additional guide pin on the container is positioned to co-operate with the toothed engaging element to effect controlled rotation of the transport container.

16. A device according to claim 11, wherein said at least one television camera is placed above said transport path of the articles and cooperative with the article recognition means in order to establish at least one of the following further features:

discharging of an article at designated article delivery location causes the transport container to be fully emptied, the article is not a strange article, and the article is in a unitary state when in its container.

17. A device according to claim 11, wherein said at least one television camera is linked to the article recognition means to provide inspection of the articles from a location above the transport path of the articles.

18. A device according to claim 11, wherein the article recognition means, the camera and the containers are configured to identify, inspect, and transport and discharge, respectively empty packaging units being at least one from the group of: cans of metal, cans of plastic, bottles of plastic, and bottles of glass.

19. A device according to claim 11, wherein the containers include a pair of bearing pins and a pair of chains or lines are provided to drive the containers through the transport path, said pair of chains or lines interacting with two pulling, rigidly interconnected, powered drive wheels around which the chains or lines are partly run;

guide wheels for guiding movement of the chains or lines along the transport path, wherein the chains or lines include opposite pairs of holders that successively cooperate with corresponding recesses in respective guide wheels for synchronous movement of said chains or lines; and wherein selected opposite pairs of said holders provide support for the pair of bearing pins on the containers.

* * * * *

UNITED STATES PATENT AND TRADEMARK OFFICE
CERTIFICATE OF CORRECTION

PATENT NO. : 7,784,618 B2  
APPLICATION NO. : 10/598708  
DATED : August 31, 2010  
INVENTOR(S) : Geir Stang Hauge, Svein Idsoe and Tore Torvbraten Page 1 of 1

It is certified that error appears in the above-identified patent and that said Letters Patent is hereby corrected as shown below:

Column 5  
Line 57, change "and back discharge" to --discharge and back--.

Column 7  
Line 33, change "metals" to --metal,--.

Column 8  
Line 7, change "arrange" to --arranged--.

Signed and Sealed this  
Twenty-fifth Day of January, 2011

David J. Kappos  
*Director of the United States Patent and Trademark Office*